United States Patent [19]
Dehesh

[11] Patent Number: 5,561,618
[45] Date of Patent: Oct. 1, 1996

[54] METHOD AND APPARATUS FOR PERFORMING A FAST HADAMARD TRANSFORM

[75] Inventor: Houtan Dehesh, San Diego, Calif.

[73] Assignee: QUALCOMM Incorporated, San Diego, Calif.

[21] Appl. No.: 173,460

[22] Filed: Dec. 22, 1993

[51] Int. Cl.$^6$ ................................................. G06F 17/14
[52] U.S. Cl. ................................................. 364/725
[58] Field of Search ................................ 364/725, 726, 364/727

[56] References Cited

U.S. PATENT DOCUMENTS

| | | | |
|---|---|---|---|
| 3,792,355 | 2/1974 | Miyata et al. | 375/34 |
| 3,956,619 | 5/1976 | Mundy et al. | 364/727 |
| 4,210,931 | 7/1980 | Bailey et al. | 358/342 |
| 4,621,337 | 11/1986 | Cates et al. | 364/727 |
| 5,097,331 | 3/1992 | Chen et al. | 348/398 |

Primary Examiner—Tan V. Mai
Assistant Examiner—Chuong D. Ngo
Attorney, Agent, or Firm—Russell B. Miller; Sean English; Brian S. Edmonston

[57] ABSTRACT

A method and apparatus are provided for performing a Hadamard transform operation. The basic building block of the apparatus is an FHT engine having a difference circuit for subtracting the input symbol from a delayed processed symbol, first multiplexer for providing either the difference of the delayed processed symbol and the input symbol or the input symbol, a summing circuit for adding the input symbol to the delayed processed symbol and a second multiplexer for providing either the sum of the input and the delayed processed symbol or the delayed processed symbol as an output. This basic engine is designed to work in conjunction with a variety of different memory configurations. The engines can then be placed in series to perform a Hadamard transform of all defined orders. In addition, two methods of optimizing the use of memory resources are described. On involves the optimal configuration of the memory elements and the second involves truncation. Also, provided is a method and apparatus for performing the transform on samples provided as a serial bit stream to the apparatus.

12 Claims, 4 Drawing Sheets

METHOD AND APPARATUS FOR PERFORMING A FAST HADAMARD TRANSFORM

BACKGROUND OF THE INVENTION

1. Field of the Invention

The present invention relates to digital signal processing. More particularly, the present invention relates to a novel and improved method and apparatus for performing fast Hadamard transformations.

II. Description of the Related Art

Waveform coding procedures transform a waveform set into an improved waveform set. The improved waveform set can then be used to provide improved probability of bit error PB compared to the original set upon communication. In the improved waveform set the signals are as unlike as possible. Another way of viewing this is to render the cross-correlation between any two waveforms i and j (denoted $z_{ij}$) as small as possible.

The cross correlation ($z_{ij}$) is defined as:

$$z_{ij} = \frac{1}{E} \int_0^T s_i(t) s_j(t) dt, \; i \neq j \quad (1)$$

and $$E = \int_0^T (s_i)^2(t) dt, \; \forall \; i.$$

where $s_i(t)$ and $s_j(t)$ are two waveform functions. In a waveform set comprised of bipolar pulses (+1,−1), the definition of the cross-correlation ($z_{ij}$) can be simplified to:

$$z_{ij} = \frac{\text{number of agreements} - \text{number of disagreements}}{\text{total number of digits}} \quad (2)$$

The smallest possible value of the cross-correlation occurs when the signals are anticorrelated ($z_{ij}=-i$); however, this can only be achieved when the number of waveforms in the set are two and the waveforms are antipodal. In general, the best achievable waveform set has all the cross-correction values equal to zero. The set is then said to be orthogonal. The most popular waveform codes used for communication purposes are orthogonal codes.

One method by which a data set can be transformed into an orthogonal data set is by means of a Hadamard transformation. A Hadamard transformation is characterized by a Hadamard matrix, in which each row of the Hadamard matrix is orthogonal to every other row of the matrix, that is in accordance with equation 2, the number of agreements equals the number of disagreements for each pair of rows. Each row of the Hadamard matrix can be referred to as a Walsh sequence.

A Hadamard matrix of order n can be defined recursively as follows:

$$H_{2n} = \begin{bmatrix} H_n & H_n \\ H_n & H'_n \end{bmatrix} \quad (3)$$

where $H_1$ is defined as:

$$H_1 = [1] \quad (4)$$

and $H_i'=-H_i$.

Thus, $$H_2 = \begin{bmatrix} 1 & 1 \\ 1 & -1 \end{bmatrix}. \quad (5)$$

Similarly, by application of equation 3, $H_4$ is found to be:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (6)$$

and $H_8$ is found to be:

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (7)$$

Fast algorithms have been developed to increase the efficiency of in the performance of Hadamard transformations. These implementations exploit the fact that Hadamard matrices are real, symmetric and row-wise orthogonal. Since the Hadamard matrices contain only +1 values, no multiplications are required in the transform calculations. Moreover the number of additions and subtractions required can be reduced from $n^2$ to $n \cdot \log_2 n$, due to the fact that a Hadamard matrix of order n ($H_n$) can be written as a product of n sparse matrices, that is, $$H_n = \tilde{H}_n^{\log 2(n)} \quad (8)$$

where $$\tilde{H}_n = \begin{bmatrix} 1 & 1 & 0 & 0 & \cdots & & & & \\ 0 & 0 & 1 & 1 & \cdots & & & & \\ \cdot & & & & & & & & \\ \cdot & & & & & & & & \\ \cdot & & & & & & & & \\ 0 & 0 & \cdots & & & & \cdots & 1 & 1 \\ 1 & -1 & 0 & 0 & \cdots & & & & \\ 0 & 0 & 1 & -1 & \cdots & & & & \\ \cdot & & & & & & & & \\ \cdot & & & & & & & & \\ \cdot & & & & & & & & \\ \cdots & \cdots & & & & & \cdots & 1 & -1 \end{bmatrix} \quad (9)$$

Noting that the top n/2 rows and the bottom n/2 rows contain only two nonzero terms per row, the transformation $$v = \tilde{H}_n^{\log 2(n)} = \tilde{H}_n \cdot \tilde{H}_n \cdots \tilde{H}_n \cdot u \quad (10)$$

can be accomplished by operating $\tilde{H}_n$ $\log_2 n$ times on u. Due to the structure of $\tilde{H}_n$ only n additions and subtractions are required each time $\tilde{H}_n$ operates on a vector, giving a total of $n \cdot \log 2(n)$ additions and subtractions.

The problem associated in the implementation of the fast Hadamard transformation described above is the burden on memory resources. In addition, the method described above does not lend itself to serial processing. Accordingly, there is a need for an improved method and apparatus for performing fast Hadamard transforms that lessen the burden on memory resources and lends itself to serial processing. Such a method is the subject of the present invention.

SUMMARY OF THE INVENTION

The present invention is a novel and improved method and apparatus for performing a fast Hadamard transform. A Hadamard transform of order 2 can be performed by an element that receives two input values a and b, and in response outputs two values (a+b) and (a−b). This element can be realized in hardware with one adder and one subtractor, two multiplexers, and a memory element.

The element described above can be achieved by providing the inputs serially to a subtracting input of the subtractor to a summing input of the adder, and to the B input of the first multiplexer. The output of the subtractor is provided to the A input of the first multiplexer, and the output of the adder is provided to the A input of the second multiplexer. The output of the first multiplexer is provided to the input of the memory element. The output of the memory element is then coupled to the summing input of the subtractor, to the second summing input of the adder, and to the B input of the second multiplexer. The transformed output is then provided serially at the output of the second multiplexer.

Now in order to provide a means for performing a Hadamard transform of order 4 the fundamental element described above is placed in series with another such element slightly modified. The second element in the series is modified by having a second memory element placed in series with the first memory element, such that the output from the first multiplexer would first be stored in the first memory element, then at the next clock cycle the data stored in the first memory element would be shifted to the second memory element before being provided to the summing inputs of the subtractor and adder and the B input of the second multiplexer on the next clock cycle.

By extension a Hadamard transformation of order 8 could be provided by adding on a third modified element, this time with four memory elements in series, and so on. The number of memory elements of the last Hadamard element will have a number of memory elements equal to half the order of the Hadamard order. It is important to note that the memory requirements of these memory elements are not the same. This is because the sum of two m bit numbers is an m+1 bit number. So the memory elements at each successive element stage is required to hold a number of accuracy one bit greater than the memory elements of the preceding element.

In order to provide savings in the memory necessary to perform this operation, as a further improvement on the previously described means the order of the elements can be reversed. For example, in the case of the Hadamard transform of order 8, the first element can have four memory elements, with memory element (m+1) bits wide where m is the number of bits in the input. The next element will have two (m+2) wide memory elements and the final element in the series will have a single (m+3) wide memory element.

It is therefore an objective of the present invention to provide a means for performing the Hadamard transformations using simplified hardware. By using single bit adders with a carry resource, a Hadamard transformation can be performed where the inputs are serialized to the transformer one bit at a time.

It is a further objective of the present invention to provide method and means for an additional savings in memory achieved through efficient truncation of values stored in the memory elements described above.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
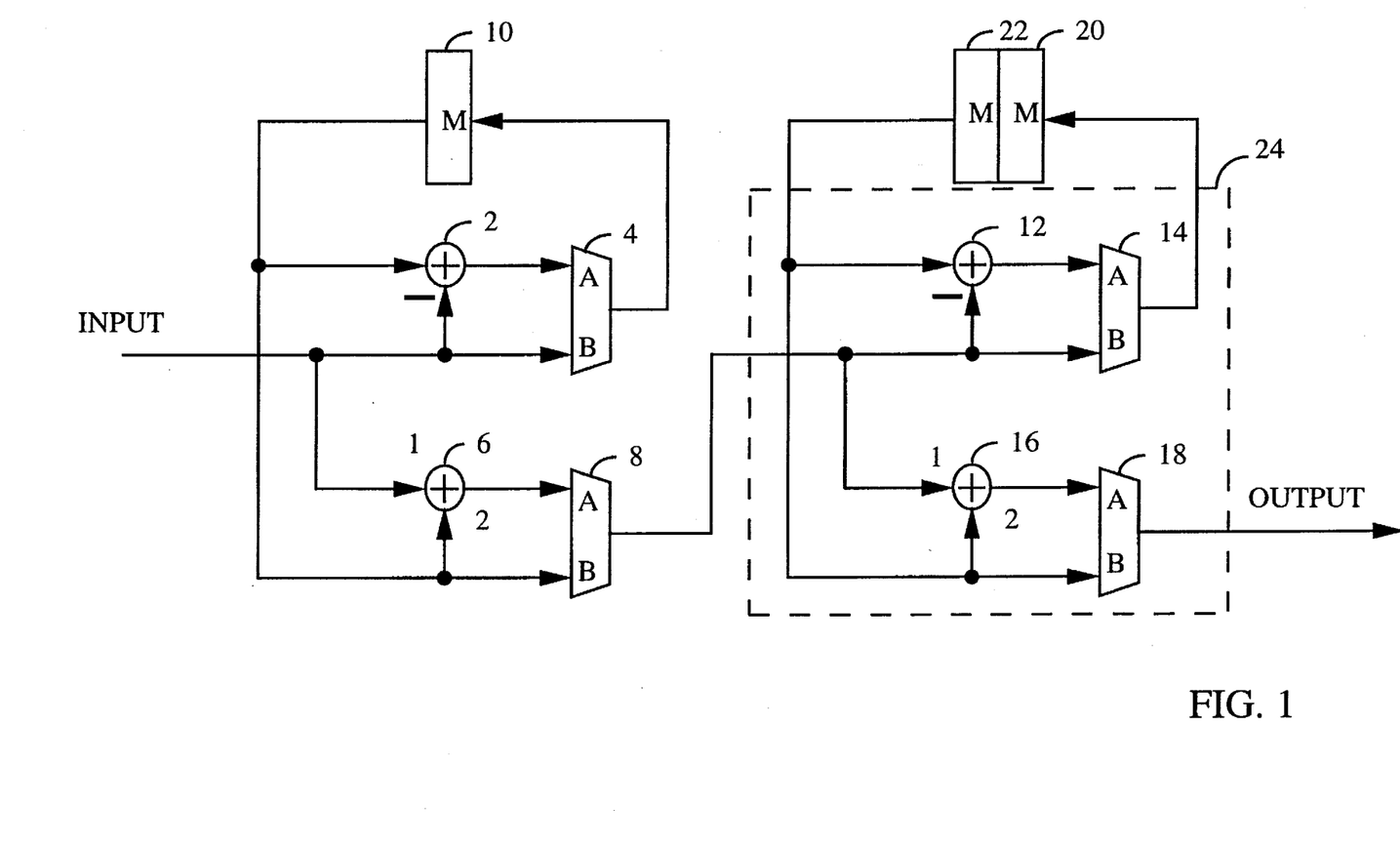
FIG. 1 is a block diagram of the Hadamard transformation apparatus for performing a Hadamard transform of order 4.

The present invention is a method and apparatus for performing a Fast Hadamard Transform (FHT). In FIG. 1, an exemplary embodiment of the present invention is illustrated for the purpose of performing a Hadamard transform of order 4. For example, if a block of four digital samples ($a_1$, $a_2$, $a_3$, $a_4$) constitute an input symbol, the apparatus shown in FIG. 3 performs an FHT on the input symbol to provide an FHT encoded symbol in accordance with Equation 11 below:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \times \begin{bmatrix} a1 \\ a2 \\ a3 \\ a4 \end{bmatrix} = \quad (11)$$

$[(a1 + a2 + a3 + a4), (a1 - a2 + a3 - a4),$
$(a1 + a2 - a3 - a4), (a1 - a2 - a3 + a4)]$

It should be noted that: the dimension of four used in the exemplary embodiment is for exemplary representation and that the method and apparatus of the present invention is equally applicable to fast Hadamard transformations (FHT) of all defined dimension.

In the exemplary embodiment each of the digital samples ($a_1$, $a_2$, $a_3$, and $a_4$) are 8 bit representations, though any other bit length is equally applicable to the present invention. The first input sample al is provided on the input signal line. Input sample $a_1$ is provided to the subtracting input of subtractor 2 (an adder configured for subtraction), the first input of summer 6, and input B of multiplexer 4. Multiplexer 4 provides to its output either the signal on the input signal line or the output from subtractor 2. On the first input cycle, multiplexer 4 output provides the signal on the input signal line. On the second input cycle, multiplexer 4 output provides the signal from subtractor 2 output to its output, and alternates in this fashion each input cycle. Thus for the first input cycle, multiplexer 4 provides sample al at its output, which is received at and stored in memory element 10.

On the second input cycle, the next input sample $a_2$ is provided to the subtracting input of the subtractor 2, the first input of summer 6, and in,put B of multiplexer 4. The stored value in memory element 10, $a_1$, is provided to the adding input of subtractor 2, to the second input of summer 6, and to input B of multiplexer 8. In response subtractor 2 provides the value of ($a_1-a_2$) at its output, which is also presented at the output of multiplexer 4 and stored in memory element 10. Summer 6 provides the value of ($a_1+a_2$) at its output. Multiplexer 8 provides at its output either the output from summer 6 or the output from memory element 10. On the second input cycle multiplexer 8 provides the output from summer 6 at its output, on the third input cycle it provides the output from memory element 10 at its output and alternates between providing these signals to its outputs each input cycle. Thus for the second input cycle, multiplexer 8 provides at its output the value output from summer 6, $(a_1+a_2)$.

The output of multiplexer 8, $(a_1+a_2)$, is provided to the subtracting input of subtractor 12, the first input of summer 16, and the B input to multiplexer 14. Multiplexer 14 provides at its output the signal from the output of multiplexer 8 for the second and third input cycles, then it provides the output from summer 12 for the fourth and fifth input cycles, and alternates every two cycles thereafter. Thus for the second input cycle, multiplexer 14 provides the signal output from multiplexer 8, $(a_1+a_2)$, to memory element 20 where it is stored.

During the third input cycle the sample $a_3$ is provided to the subtracting input of subtractor 2, the first input of summer 6, and input B of multiplexer 4. Memory element 10 provides its stored value $(a_1+a_2)$ to the adding input of subtractor 2, to the second input of summer 6, and to the B input of multiplexer 8. Multiplexer 4 provides the value from the input signal line, $a_3$, to memory element 10 where it is stored. Multiplexer 8 provides the signal on its B input $(a_1-a_2)$ at its output.

The value output by multiplexer 8, $(a_1-a_2)$, is provided to the subtracting input of subtractor 12, the first input of summer 16, and the B input to multiplexer 14. Memory element 20 transfers its contents $(a_1+a_2)$ to memory element 22. Multiplexer 14 provides the output signal from multiplexer 8, $(a_1-a_2)$, to memory element 20.

In the forth cycle, the next input sample $a_4$ is provided to the subtracting input of subtractor 2, the first input of summer 6, and input B of multiplexer 4. Memory element 10 provides its stored value, $a_3$, to the adding input of subtractor 2, to the second input of summer 6, and to the B input of multiplexer 8. Summer 2 provides $(a_3-a_4)$ to the A input of multiplexer 4. Multiplexer 4 provides the output from subtractor 2, $(a_3-a_4)$, to memory element 10 where it is stored. Summer 6 provides the sum $(a_3+a_4)$ to the A input of Multiplexer 8. Multiplexer 8 provides the signal output from summer 6, $(a_3+a_4)$, at its output.

The value output by multiplexer 8, $(a_3+a_4)$, is provided to the subtracting input of subtractor 12, the first input of summer 16, and the B input to multiplexer 14. Memory element 22 then provides its contents, $(a_1+a_2)$, to the adding input of subtractor 12, the second input of summer 16 and the B input of multiplexer 18. Memory element 20 transfers its contents, $(a_1+a_2)$, to memory element 22. Summer 12 in response provides the sum of its inputs $(a_1+a_2)-(a_3+a_4)$ to the A input of multiplexer 14. Multiplexer 14 provides the value output by subtractor 12, $(a_1+a_2)-(a_3+a_4)$, to memory element 20 where it is stored. Summer 16 then provides the sum of its two inputs $(a_1+a_2)+(a_3+a_4)$, to the A input of multiplexer 18. Multiplexer 18 provides the signal output by summer 16 for input cycles 4 and 5, then provides the output from memory element 22 as output for input cycles 6 and 7, and alternates every two cycles thereafter. Multiplexer 18 provides the desired sum $(a_1+a_2+a_3+a_4)$ as the first output of the second stage of the FHT apparatus.

In the fifth input cycle, the next input sample $a_5$ is provided to the subtracting input of the subtractor 2, the first input of summer 6, and input B of multiplexer 4. Memory element 10 provides its stored value $(a_3-a_4)$ to the adding input of summer 2, to the second input of summer 6, and to the B input of multiplexer 8. Multiplexer 4 provides the value on the input signal line, $a_5$, to memory element 10 where it is stored. Multiplexer 8, provides the signal, output from memory element 10, $(a_3-a_4)$, at its output.

The value at the output of multiplexer 8, $(a_3-a_4)$, is provided to the subtracting input of summer 12, the first input of summer 16, and the B input to multiplexer 14. Memory element 22 provides its contents, $(a_1-a_2)$, to the adding input of subtractor 12, the second input of summer 16 and the B input of multiplexer 18. Memory element 20 transfers its contents, $(a_1+a_2)-(a_3+a_4)$, to memory element 22. Subtractor 12 provides $(a_1-a_2)-(a_3-a_4)$ to the first input of multiplexer 14 which provides this value to memory element 20. Likewise summer 16 provides $(a_1-a_2)+(a_3-a_4)$, or $(a_1-a_2+a_3-a_4)$, to the first input of multiplexer 18, which provides this value at its output.

In the sixth input cycle, the next input sample $a6$ is provided to the subtracting input of the subtractor 2, the first input of summer 6, and input B of multiplexer 4. Memory element 10 provides its stored value, as, to the adding input of subtractor 2, to the second input of summer 6, and to the B input of multiplexer 8. Subtractor 2 provides $(a_5-a_6)$ to the A input of multiplexer 4. Multiplexer 4 provides the value on its A input, $(a_5-a_6)$, to memory element 10 where it is stored. Summer 6 provides $(a_5+a_6)$ to the A input of Multiplexer 8. Multiplexer 8 provides the signal on its A input, $(a_5+a_6)$, at its output.

The output from multiplexer 8, $(a_5+a_6)$, is provided to the subtracting input of subtractor 12, the first input of summer 16, and the B input to multiplexer 14. Memory element 22 then provides its contents, $(a_1+a_2)-(a_3+a_4)$, to the adding input of subtractor 12, the second input of summer 16 and the B input of multiplexer 18. Memory element 20 transfers its contents, $(a_1-a_2)-(a_3-a_4)$, to memory element 22. Multiplexer 14 provides its B input signal $(a_5+a_6)$ to memory element 20 where it is stored. Multiplexer 18 provides the value of the B input signal, $(a_1+a_2)-(a_3+a_4)=(a_1+a_2-a_3-a_4)$, at its output.

In the seventh input cycle, the next input sample $a_7$ is provided to the subtracting input of subtractor 2, the first input of summer 6, and input B of multiplexer 4. Memory dement 10 provides its stored value, $(a_5-a_6)$, to the adding input of summer 2, to the second input of summer 6, and to the B input of multiplexer 8. Multiplexer 4 provides the value on the B input, $a_7$, to memory element 10 where it is stored. Multiplexer 8 provides the signal on its B input, $(a_5-a_6)$, at its output The output of multiplexer 8, $(a_5-a_6)$, is provided to the subtracting input of subtractor 12, the first input of summer 16, and the B input to multiplexer 14. Memory element 22 then provides its contents, $(a_1-a_2)-(a_3-a_4)$, to the adding input of subtractor 12, the second input of summer 16 and the B input of multiplexer 18. Memory element 20 transfers its contents, $(a_5+a_6)$, to memory element 22. Multiplexer 14 provides its B input signal, $(a_5-a_6)$, to memory element 20 where it is stored. Multiplexer 18 provides the value of the B input signal, $(a_1-a_2)-(a_3-a_4)=(a_1-a_2-a_3+a_4)$, at its output.

Note that the FHT of the input sequence $(a_1,a_2,a_3,a_4)$, $(a_1+a_2+a_3+a_4, a_1a_2+a_3-a_4, a_1+a_2-a_3-a_4, a_1+a_2-a_3-a_4)$ has been successfully output by the apparatus. By inputting the next in the series to the apparatus, $a_8$, the first element of the FHT of input sequence $(a_5,a_6,a_7,a_8)$, which is $a_5+a_6+a_7+a_8$ appears at the output of the apparatus. The process can be continued indefinitely.

The fundamental element of the FHT apparatus is the shown in the dashed lines of block 24. Block 24 is composed of one subtractor 12, one summer 16 and two multiplexers (multiplexers 14 and 18), this subsystem is referred to as the FHT engine. Note that the subtractor is a summer with an inverting input. In combination with the memory devices or memory elements they makeup a complete FHT stage. Additional stages can be added on by providing an output of a previous stage to an added stage. The only difference between a stage and its previous stage is the number of memory elements doubles (also the number of bits in a given memory element must increase by one) and the timing of the memory elements changes switching only half as often as the previous stage.

Figure 2:
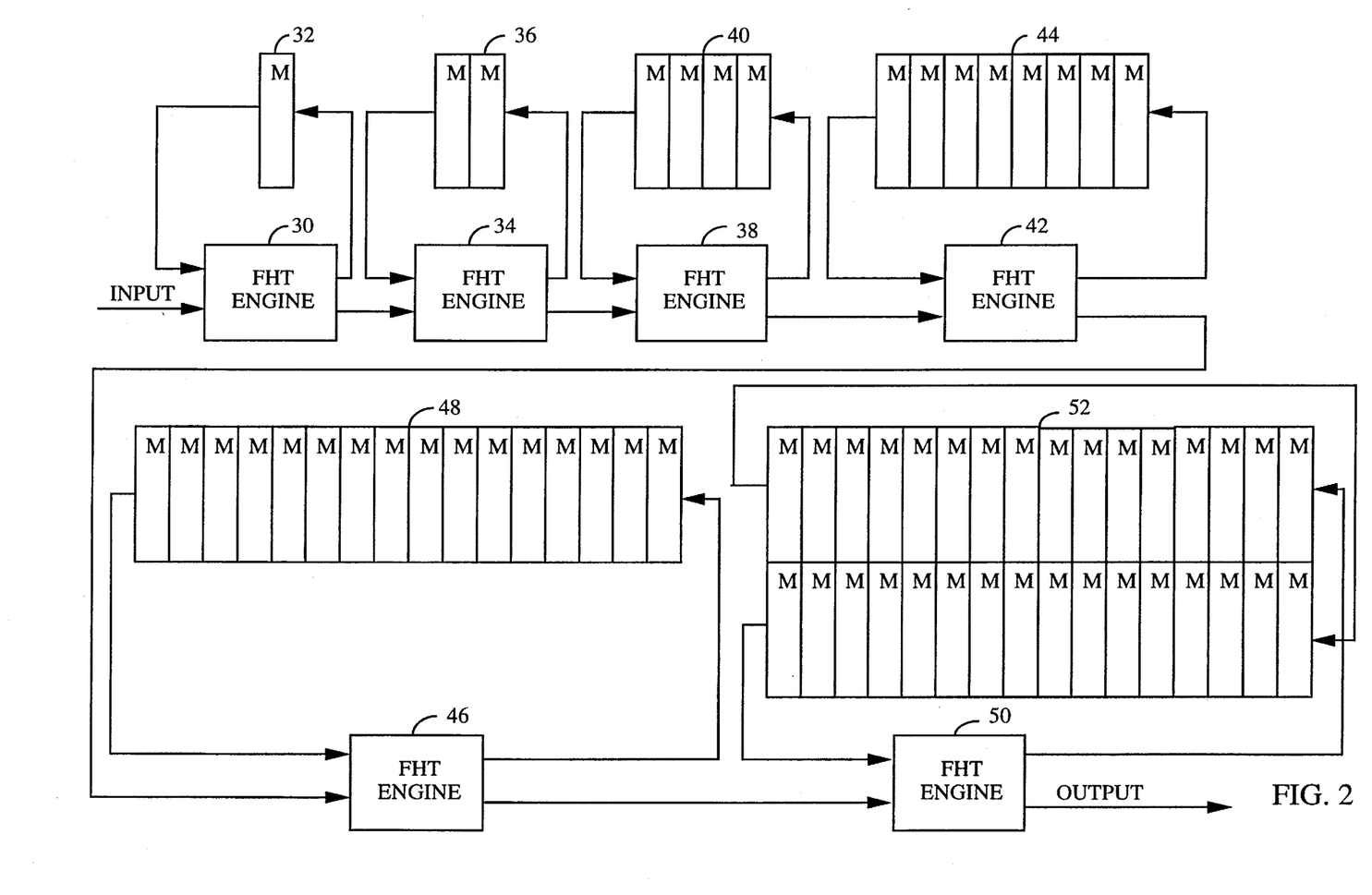
FIG. 2 is a block diagram of the Hadamard transformation apparatus for performing a Hadamard transform of order 64.

In FIG. 2, a block diagram of an FHT an apparatus for performing an FHT of order 64 is illustrated. The FHT engines 30, 34, 38, 42, 46 and 50 are all identical to the FHT engine illustrated in detail in block 24 of FIG. 1, and memory devices 32, 36, 40, 44, 48 and 52 are a plurality of interconnected memory elements or data latches, such as formed by a shift register, also as described in FIG. 1. In the exemplary embodiment, the data input into FHT engine 30 is comprised of eight bit numbers, though the present invention is equally applicable to data of any bit length.

Since in this exemplary embodiment the input data stream is comprised of 8 bit/sample, data, the memory element in memory device 32 must be able to hold nine bits to accommodate the possible outputs of FHT engine 30 without truncation, since the sum of two n-bit numbers is an (n+1)-bit number. Similarly, the memory elements of memory device 36 must be able to store 10 bits. The memory elements of memory device 40 must be able to store 11 bits; those of memory device 44 must be able to store 12 bits; those of memory, device 48 must be able to store 13 bits and the memory elements of memory device 52 must be able to store 14 bits.

Figure 3:
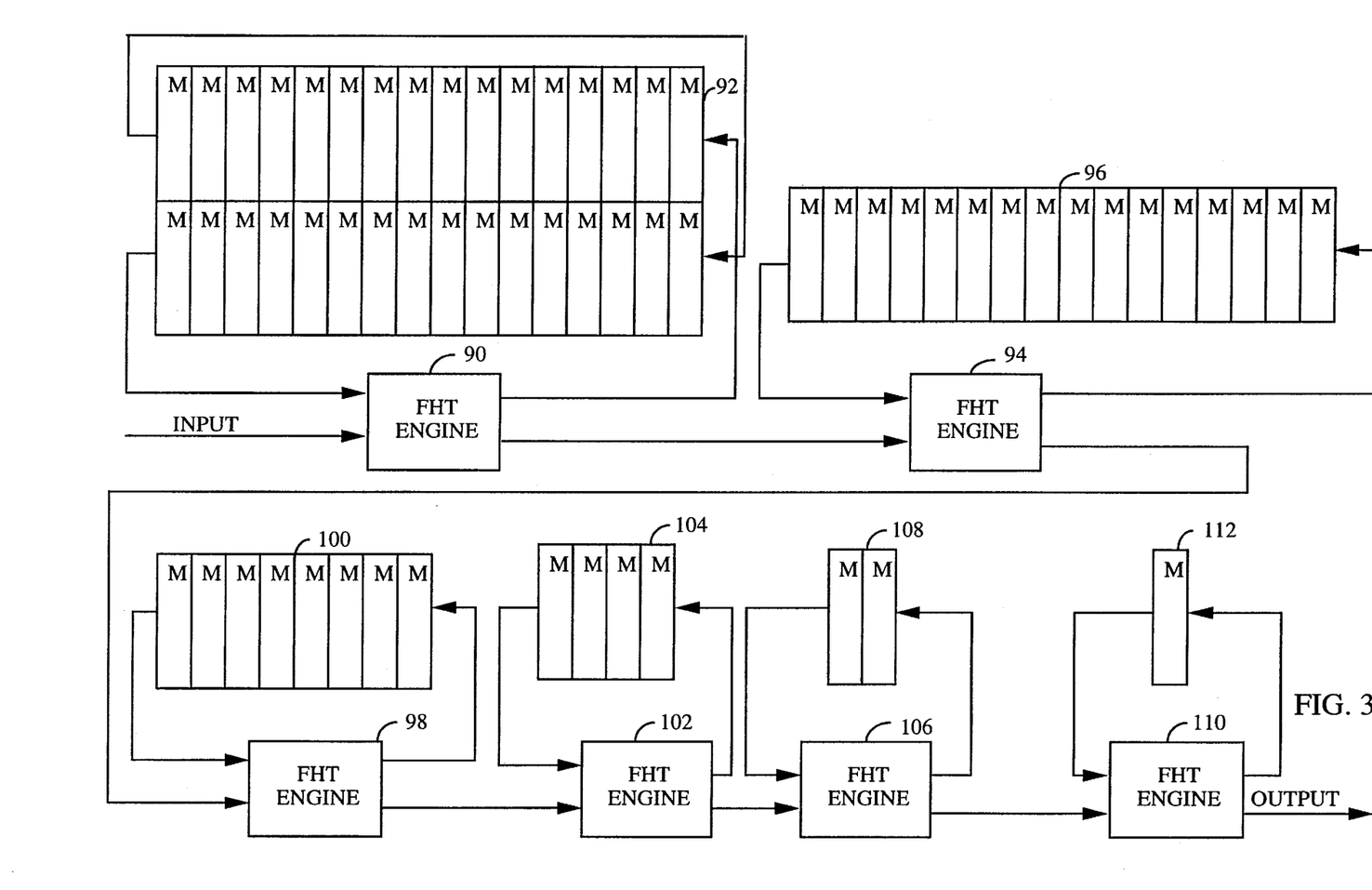
FIG. 3 is a block diagram of an improved implementation of Hadamard transformation apparatus for performing a Hadamard transform of order 64.

FIG. 3 illustrates an improved embodiment of the present invention. The apparatus shown in FIG. 3 performs a fast Hadamard transform of order 64:. The FHT engines 90, 94, 98, 102, 106 and 110 are identical in construction to the FHT engine 24 shown in detail in FIG. 1. The only difference that occurs in the operation of the FHT engines in FIG. 3 as opposed to those shown in FIG. 2 occurs in the switching of the multiplexers (not shown) of FHT engines 90, 94, 98, 102, 106 and 110. The multiplexers of the first stage FHT engine 90 switch only every 32 input cycles. The multiplexers of FHT of the second stage FHT engine 94 switch every 16 input cycles. The multiplexers of the last stage FHT engine 110 switch every input cycle.

The significant difference between the improved embodiment illustrated in FIG. 3 and the embodiment illustrated in FIG. 2 is the savings in total memory used. Recalling the exemplary embodiment for processing data of bit length eight, the first memory device had to be capable of storing a nine bit number the next, whereas the memory devices of the next stage would need to store a ten bit number. Therefore, in this improved embodiment the stages where the memory devices are required to store the lowest number of bits are used to store the largest number of values. Memory device 92 stores thirty-two 9-bit numbers, device 96 sixteen 10-bit numbers, device 100 eight 11-bit numbers, device 104 four 12-bit numbers, device 108 two 13-bit numbers and device 112 one 14-bit number. The number of bits of memory saved using this improved embodiment can be calculated by the formula below:

$$\text{\# of bits saved} = \sum_{i=1}^{\log_2(n)} (m+i) \, 2^{i-1} - (m+i) \cdot 2^{\log_2 n - i} \tag{12}$$

$$= \sum_{i=1}^{\log_2(n)} (m+i) \cdot (2^{\log_2(n)-i} - 2^{i-1}).$$

where n is the order of the FHT being performed and m is the number of bits per input.

Figure 4:
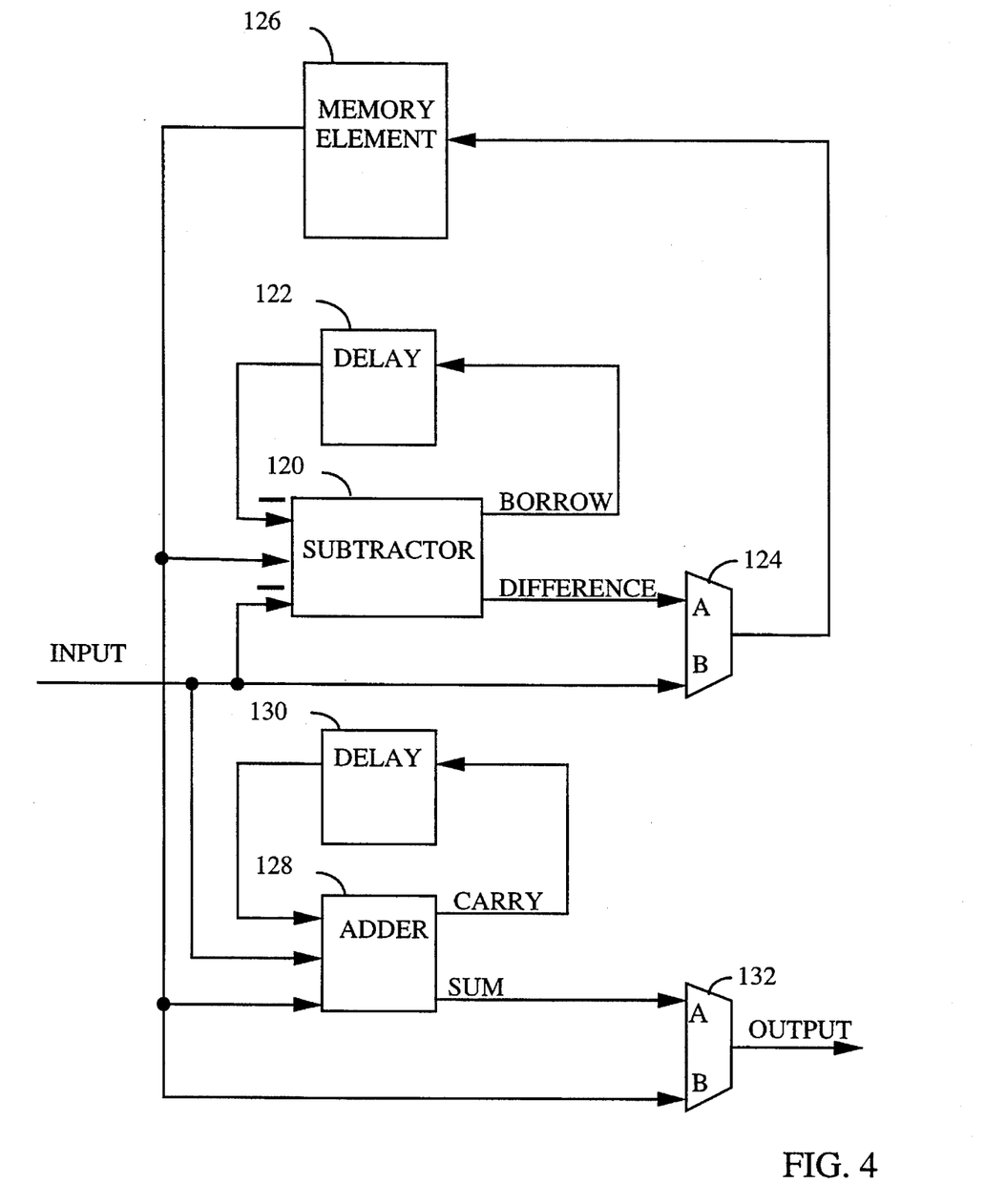
FIG. 4 is block diagram of a serial input FHT stage.

In FIG. 4, an alternative implementation of the present invention is illustrated for receiving samples as a serial bit stream. In this implementation the bits that comprise the input samples are provided to the FHT apparatus serially. For each input sample, the bits of the sample are provided to the FHT engine least significant bit (LSB) to most significant bit (MSB). An input bit is provided to the first subtracting input of subtractor 120, a B input of multiplexer 124, and the first adding input of adder 128. In addition, the output data from the memory element 126 is provided to the adding input of subtractor 120. The last input to subtractor 120, a second subtracting input, is the borrow bit from the previous operation, which is provided by delay 122. Delay elements 122 and 130 provide a delay equal to a single bit period in duration. Subtractor 120 then subtracts the delayed borrow bit and the current subtracting input bit from the adding bit. This operation provides two bits of output data, including a borrow bit which is provided to delay 122, and a difference bit which is provided to the A input of multiplexer 124.

Multiplexer 124 selects the data on one of its two inputs for providing to its output. The switching cycles of the multiplexers 124 and 132 are the same as described previously noting of course that an input cycle is defined as the time period required to provide all bits comprising an input sample. As previously mentioned the input bit is provided to the first adding input of adder 128. The output of the memory element 126 is also provided to a second adding input of adder 128. In addition, a delayed carry bit from the previous summing operation of adder 128 is provided by delay 130 to the third adding input of adder 128. The sum of the three inputs (the delayed carry, the input bit anti the output bit from the memory element) are summed to provide two bits of data. The first bit, the carry bit, is provided to delay element 130 and the sum bit is provided to the A input of multiplexer 132. Multiplexer 132 also receives at its B input the output bit of memory element 126. Multiplexer 132 then selects the data on one of its two inputs to provide at its output as a bit of one of the FHT coefficients in accordance with the switching operation described above.

A final method that can be used alone or in combination with the above mentioned improvements is by means of truncation. When the data is provided in a parallel fashion to the FHT apparatus, truncation can be achieved by simply providing only a predetermined number of most significant bits of data to the memory elements. In the case where the data provided to the FHT apparatus is a serial stream, the bits provided least significant bit first to a memory element are shifted into and eventually out of the first memory element behaving as a serially loaded parallel output shift register. When only the most significant bits remain in the memory element, truncation is achieved, and these bits can then be parallel shifted to the next memory element.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In an integrated circuit, a method for performing a transformation comprising the steps of:

receiving an input symbol;

subtracting said input symbol from a delayed processed symbol to provide a difference symbol;

selecting a processed symbol from said difference and said input symbol in an alternating manner;

storing said processed symbol in a memory element for a predetermined duration to provide said delayed processed symbol;

summing said processed symbol with said input symbol to provide a sum symbol; and selecting a transformed output symbol from said sum and said delayed processed symbol in an alternating manner.

2. The method of claim 1 wherein said step of delaying said processed symbol comprises the steps of:

shifting a plurality of stored processed symbols into arrays each having different indices including a final index; and storing said processed symbol into an array with an initial index; wherein the stored processed symbol stored in an array with said final index is provided as said delayed processed symbol.

3. The method of claim 1 wherein said step of receiving said input symbol comprises receiving the bits of said input symbol serially;

wherein said step of subtracting said input symbol from a delayed processed symbol further comprises subtracting a borrow symbol from said delayed processed symbol and further comprises providing said borrow symbol in accordance with said step of subtracting; and wherein said step of summing said processed symbol with said input symbol further comprises summing a carry symbol with said processed symbol and said input symbol to further provide said carry symbol.

4. A circuit for performing a fast transform comprising:

a first fast transform circuit having a first input for receiving data to be transformed, a second input for receiving delayed data, a first output for providing processed data, and a second output for providing first transformed data for performing a partial Hadamard transform function; p1 a second fast transform circuit having a first input for receiving said first transformed data, a second input for receiving delayed data, a first output for providing processed data, and a second output for providing second transformed data for performing said partial Hadamard transform function;

a first delay circuit for receiving said processed data from said first fast transform circuit and for providing said delayed data to said second input of said first fast transform circuit; and a second delay circuit for receiving said processed data from said second fast transform circuit and for providing said delayed data to said second input of said second fast transform circuit.

5. The circuit as set forth in claim 4 further comprising:

a third fast transform circuit having a first input for receiving said second transformed data, a second input for receiving delayed data, a first output for providing processed data, and a second output for providing third transformed data for performing said partial Hadamard transform function;

a third delay circuit for receiving said processed data from said third fast transform circuit and for providing said delayed data to said second input of said third fast transform circuit.

6. The circuit as set forth in claim 5 wherein said third fast transform circuit comprises:

subtractor circuit for subtracting data from said first input from data from said second input to produce a difference symbol;

first multiplexer circuit for selecting a processed symbol from said difference symbol and data from said first input in a first alternating manner and providing said processed symbol on said first output as said processed data;

summer circuit for summing said data from said first input with data from said second input to provide a sum symbol; and second multiplexer circuit for selecting said transformed data from said delayed processed symbol and said sum symbol in a second alternating manner provided on said first output.

7. The circuit as set forth in any one of claims 5 or 6 wherein said delayed data from said third delay circuit is delayed half as long as said delayed data from said second delay circuit.

8. The circuit as set forth in any one of claims 5 or 6 wherein said delayed data from said third delay circuit is delayed twice as long as said delayed data from said second delay circuit.

9. The circuit as set forth in claim 4 wherein said delayed data from said first delay circuit is delayed half as long as said delayed data from said second circuit.

10. The circuit as set forth in claim 4 wherein said delayed data from said first delay circuit is delayed twice as long as said delayed data from said second delay circuit.

11. The circuit as set forth in any one of claims 4, 5, 9 or 10 wherein said first and second fast transform circuits subtract data from said first input from data from said second input to produce a difference symbol, select a processed symbol from said difference symbol and data from said first input in a first alternating manner and providing said processed symbol on said first output as said processed data, sum said data from said first input with data from said second input to provide a sum symbol, and select said transformed data from said delayed processed symbol and said sum symbol in a second alternating manner provided on said first output.

12. The circuit as set forth in claim 4 wherein said first and second fast transform circuits comprise:

subtractor circuit for subtracting data from said first input from data from said second input to produce a difference symbol;

first multiplexer circuit for selecting a processed symbol from said difference symbol and data from said first input in a first alternating manner and providing said processed symbol on said first output as said processed data;

summer circuit for summing said data from said first input with data from said second input to provide a sum symbol; and second multiplexer circuit for selecting said transformed data from said delayed processed symbol and said sum symbol in a second alternating manner provided on said first output.

* * * * *

UNITED STATES PATENT AND TRADEMARK OFFICE
CERTIFICATE OF CORRECTION

PATENT NO.   : 5,561,618
DATED        : October 1, 1996
INVENTOR(S)  : Houtan Dehesh It is certified that error appears in the above-identified patent and that said Letters Patent is hereby corrected as shown below:

<u>Column 9,</u>
Line 17, please change the word "delaying" to -- storing --.

Signed and Sealed this

Eighteenth Day of March, 2003

JAMES E. ROGAN
*Director of the United States Patent and Trademark Office*